United States Patent
Ho

(10) Patent No.: US 12,222,773 B2
(45) Date of Patent: Feb. 11, 2025

(54) WIRE-PASSABLE HINGE

(71) Applicant: FOSITEK CORPORATION, New Taipei (TW)

(72) Inventor: Hsiu-Fan Ho, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/350,569

(22) Filed: Jul. 11, 2023

(65) Prior Publication Data

US 2024/0393839 A1  Nov. 28, 2024

(30) Foreign Application Priority Data

May 26, 2023 (TW) .................................. 112119694

(51) Int. Cl.
| | | |
|---|---|---|
| *E05D 11/00* | (2006.01) | |
| *F16C 11/04* | (2006.01) | |
| *G06F 1/16* | (2006.01) | |

(52) U.S. Cl.
CPC ............ *G06F 1/1681* (2013.01); *F16C 11/04* (2013.01); *E05D 11/0081* (2013.01); *E05Y 2999/00* (2024.05)

(58) Field of Classification Search
CPC ........ H01R 35/02; H01R 35/04; H01H 3/162; H01H 3/161; H01H 13/10; E05D 11/00; E05D 11/0081; E05D 3/02; E05D 2003/025; E05D 2900/531; E05D 2800/678; E05D 7/00; E05D 5/04; G06F 1/1681; G06F 1/1683; B21D 53/40; E05Y 2900/132; E05Y 2999/00; F16C 11/04
See application file for complete search history.

(56) References Cited

U.S. PATENT DOCUMENTS 5,131,779 A * 7/1992 Sen ........................ F16M 11/10
16/342
5,566,048 A * 10/1996 Esterberg .............. G06F 1/1681
16/342
(Continued)

FOREIGN PATENT DOCUMENTS

| GB | 2433769 A * | 7/2007 | ........... G06F 1/1616 |
| TW | M447074 U1 | 2/2013 | |

OTHER PUBLICATIONS

Taiwanese Search Report for Taiwanese Application No. 112119694, dated Nov. 20, 2023, with English translation.

*Primary Examiner* — Chuck Y Mah
(74) *Attorney, Agent, or Firm* — Birch, Stewart, Kolasch & Birch, LLP

(57) ABSTRACT

A wire-passable hinge is mounted between a first casing body and a second casing body. The first casing body and the second casing body are electrically connected to each other by a conductive wire. The wire-passable hinge includes a rotary rod that has a wire passageway to allow passage of the conductive wire, and a bushing that is sleeved rotatably on the rotary rod. A first hinge casing is connected to the first casing body. The rotary rod extends into the first hinge casing. The first hinge casing further allows the conductive wire to pass therethrough. A second hinge casing is connected to the second casing body. The bushing is disposed within the second hinge casing. The second hinge casing further allows the conductive wire to pass therethrough.

9 Claims, 12 Drawing Sheets

(56) References Cited

U.S. PATENT DOCUMENTS

| | | | | |
|---|---|---|---|---|
| 5,970,580 | A * | 10/1999 | Katoh | G06F 1/1616 |
| | | | | 16/337 |
| 7,380,313 | B2 * | 6/2008 | Akiyama | G06F 1/1681 |
| | | | | 16/326 |
| 2008/0229544 | A1 * | 9/2008 | Hsu | G06F 1/1683 |
| | | | | 16/319 |
| 2010/0122434 | A1 * | 5/2010 | Lin | H04M 1/0216 |
| | | | | 16/386 |
| 2012/0060324 | A1 * | 3/2012 | Lin | G06F 1/1616 |
| | | | | 16/303 |
| 2013/0182403 | A1 * | 7/2013 | Yang | G06F 1/1683 |
| | | | | 16/386 |
| 2013/0342974 | A1 * | 12/2013 | Hung | H04M 1/0216 |
| | | | | 361/679.01 |
| 2014/0033477 | A1 * | 2/2014 | Wang | G06F 1/1681 |
| | | | | 16/376 |
| 2015/0089770 | A1 * | 4/2015 | Liang | G06F 1/16 |
| | | | | 16/386 |
| 2016/0161994 | A1 * | 6/2016 | Lee | G06F 1/1681 |
| | | | | 16/385 |

* cited by examiner

WIRE-PASSABLE HINGE

CROSS-REFERENCE TO RELATED APPLICATION

This application claims priority to Taiwanese Patent Application No. 112119694, filed on May 26, 2023.

FIELD

The disclosure relates to a hinge, and more particularly to a wire-passable hinge.

BACKGROUND

Referring to FIGS. 1 and 2, an existing foldable electronic device 9, such as a laptop computer, includes two casing body 91. Mounted between the casing bodies 91 are a hinge 8, a conductive wire 92, and a hinge protector casing 93. The hinge protector casing 93 is used to protect the hinge 8 and the conductive wire 92. As a result, the foldable electronic device 9 has a complicated structure in design and a low space utilization rate, thereby causing its product size to be relatively large in a manner not conducive to be thinner. There is still room for improvement.

SUMMARY

Therefore, an object of the disclosure is to provide a wire-passable hinge that can alleviate at least one of the drawbacks of the prior art.

According to the disclosure, a wire-passable hinge is adapted to be mounted between a first casing body and a second casing body of an electronic device. The first casing body and the second casing body are electrically connected to each other by a conductive wire. The wire-passable hinge includes a rotary rod unit and a hinge casing unit.

The rotary rod unit includes a rotary rod that has a wire passageway adapted to allow the conductive wire to pass therethrough, and a bushing that is sleeved rotatably on the rotary rod.

The hinge casing unit includes a first hinge casing and a second hinge casing. The first hinge casing is adapted to be connected to the first casing body. The rotary rod extends immovably into the first hinge casing. The first hinge casing is further adapted to allow the conductive wire to pass therethrough. The second hinge casing is adapted to be connected to the second casing body. The bushing is disposed immovably within the second hinge casing. The second hinge casing is further adapted to allow the conductive wire to pass therethrough.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
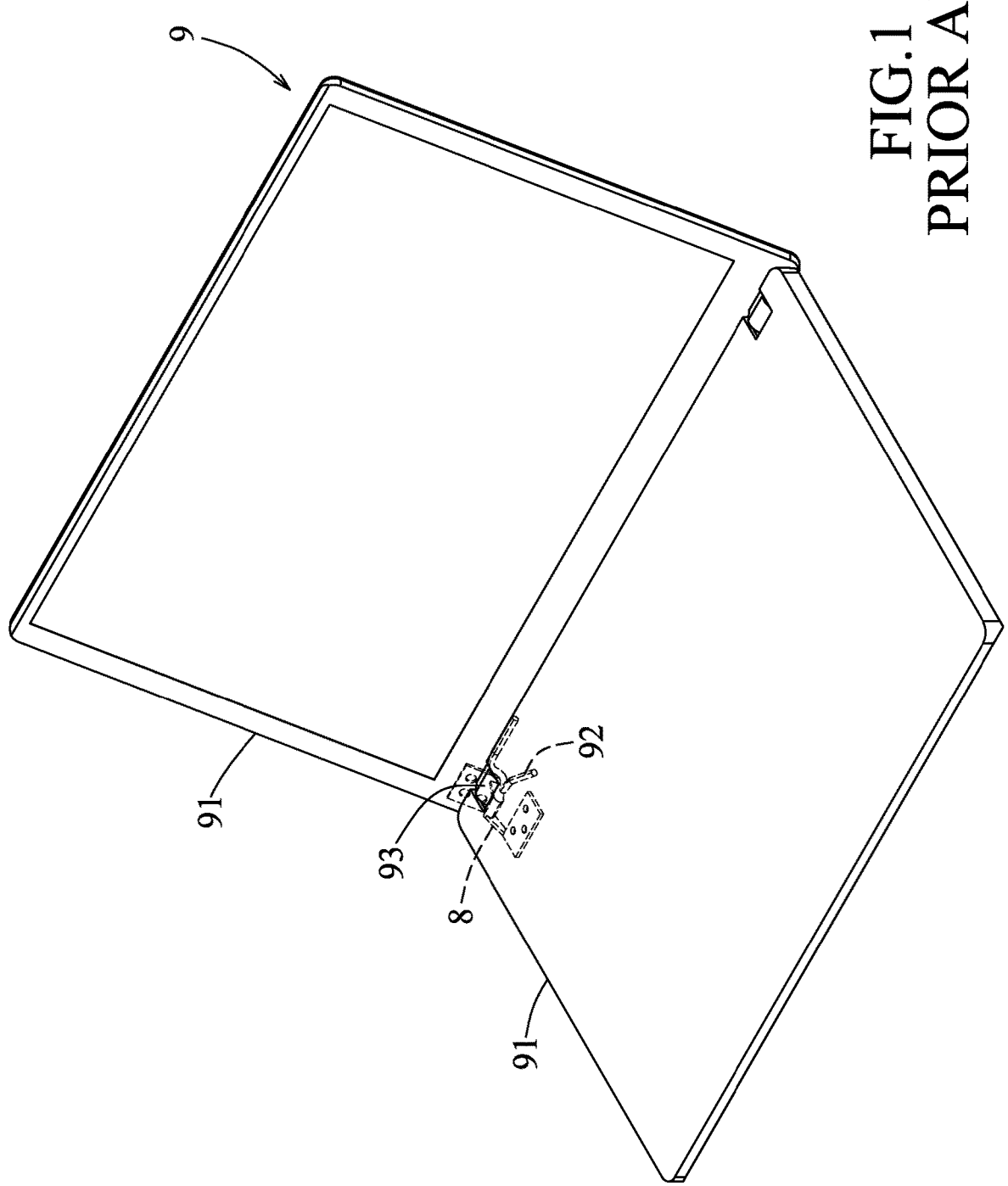
FIG. 1 is a perspective view illustrating an existing electronic device.
Figure 2:
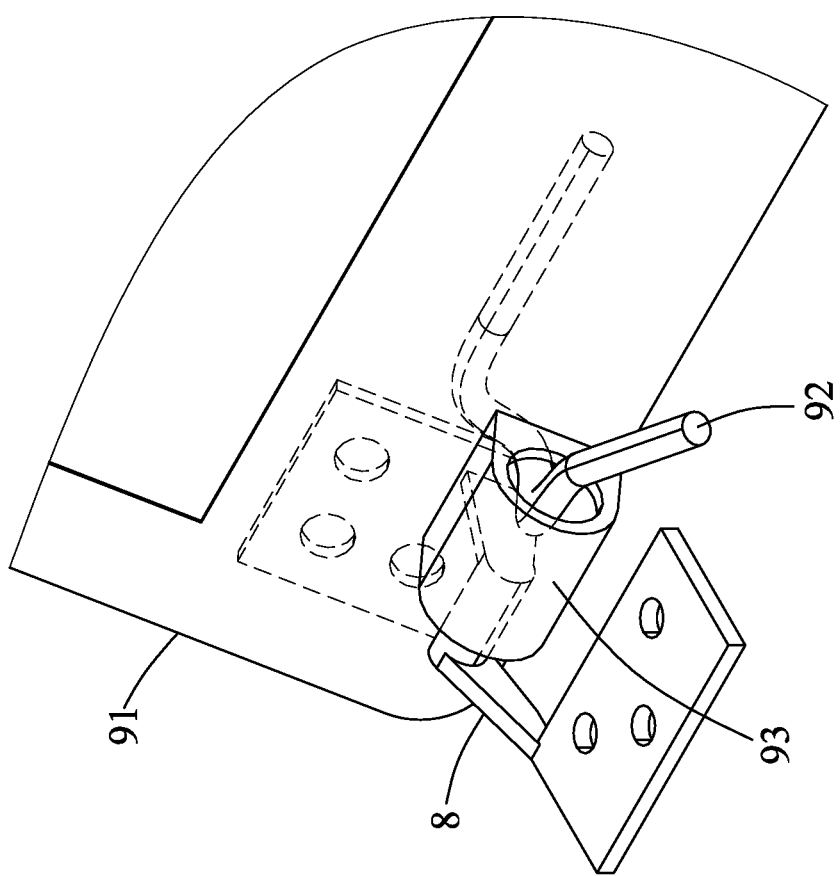
FIG. 2 is a fragmentary perspective view of the existing electronic device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
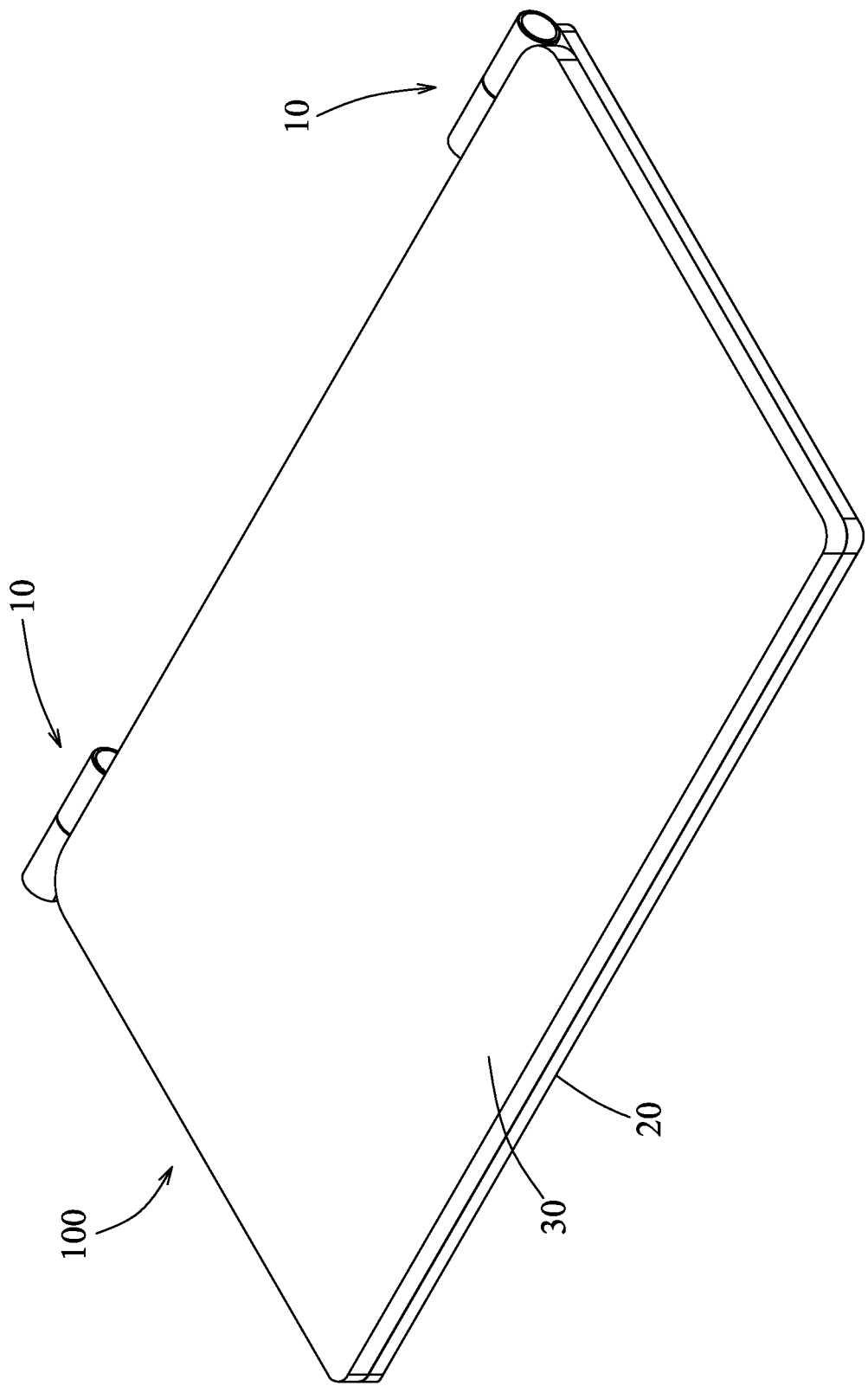
FIG. 3 is a perspective view illustrating two wire-passable hinges according to an embodiment of the disclosure mounted between a first casing body and a second body of an electronic device in a folded state.
Figure 4:
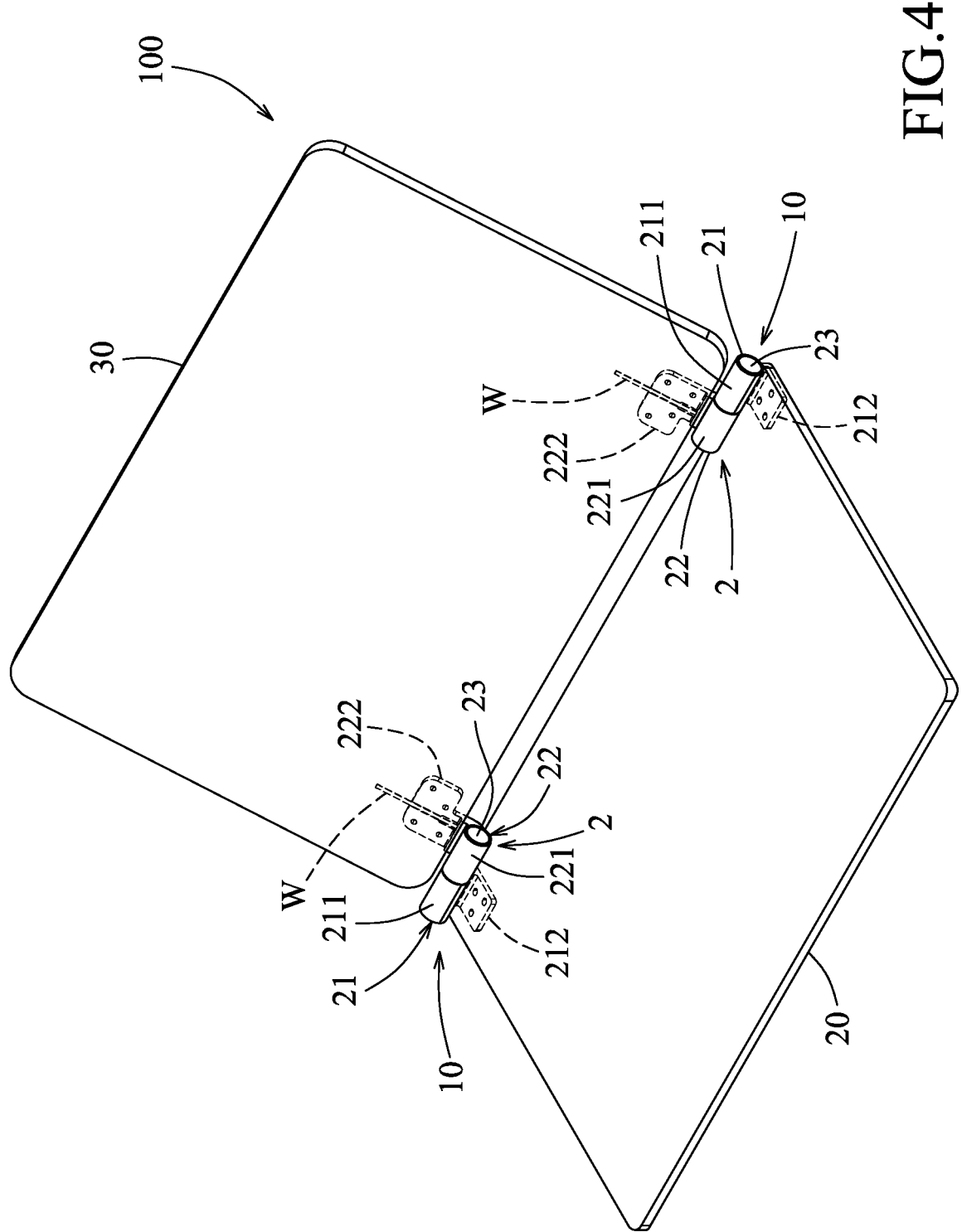
FIG. 4 is a view similar to FIG. 3, but illustrating the wire-passable hinges and the electronic device in an unfolded state.
Figure 5:
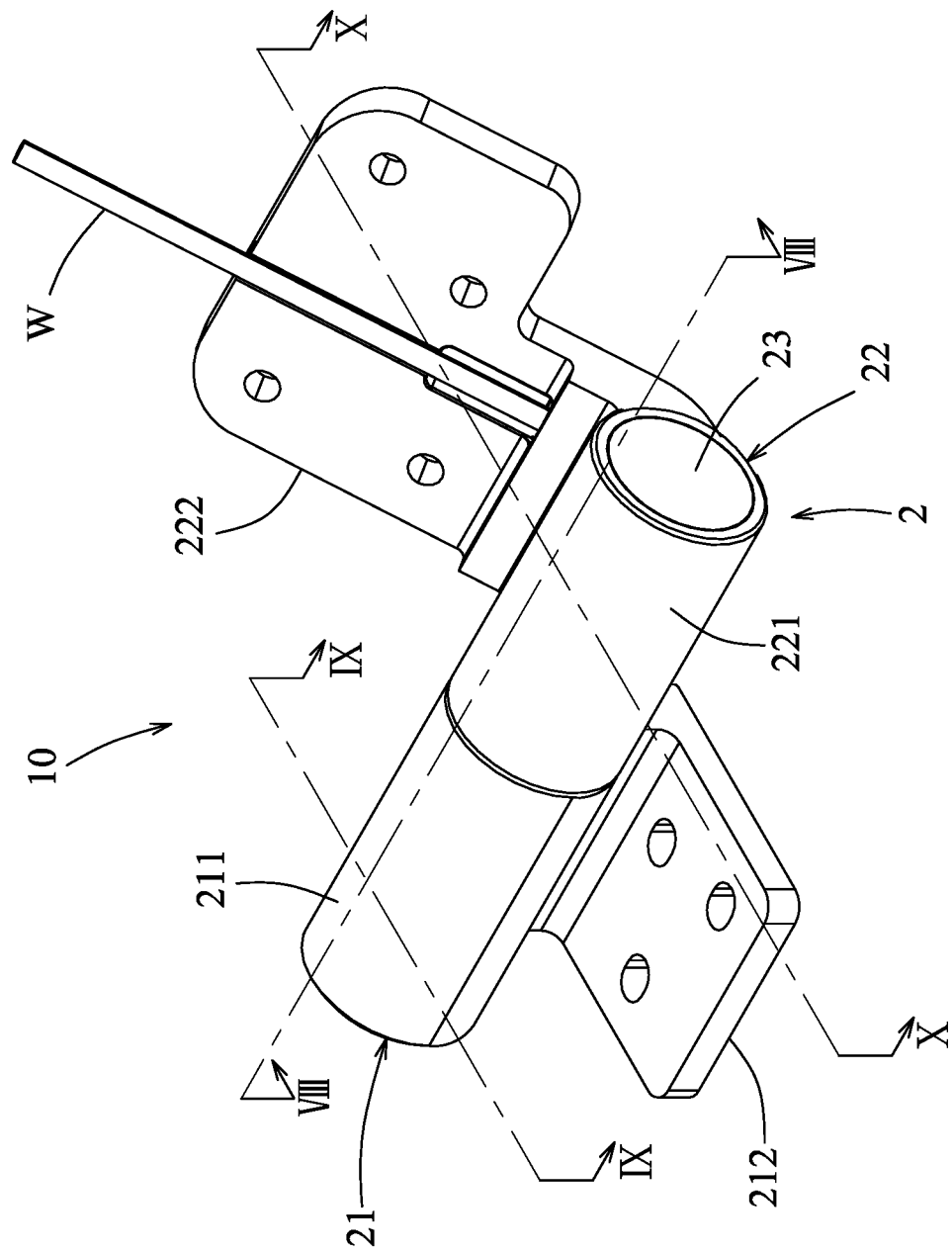
FIG. 5 is an enlarged perspective view of the embodiment illustrating the wire-passable hinge of the disclosure for passage of a conductive wire.

Referring to FIGS. 3 to 6, a wire-passable hinge 10 according to an embodiment of the disclosure is adapted to be mounted between a first casing body 20 and a second casing body 30 of an electronic device 100. As shown in FIGS. 3 and 4, two wire-passable hinges 10 are symmetrically mounted between the first casing body 20 and the second casing body 30. The first casing body 20 and the second casing body 30 are electrically connected to each other by two conductive wires (W) respectively extending through the wire-passable hinges 10 for transmission of data and signals. The electronic device 100 may be a foldable electronic handheld device such as a cellular phone, a tablet computer, or a laptop computer. For illustration in this embodiment, a tablet computer with a keyboard is shown as an example. The first casing body 20 is used for disposition of the keyboard, and the second casing body 30 has a tablet screen. Each of the wire-passable hinges 10 of the disclosure has a rotary rod unit 1 and a hinge casing unit 2.

Figure 6:
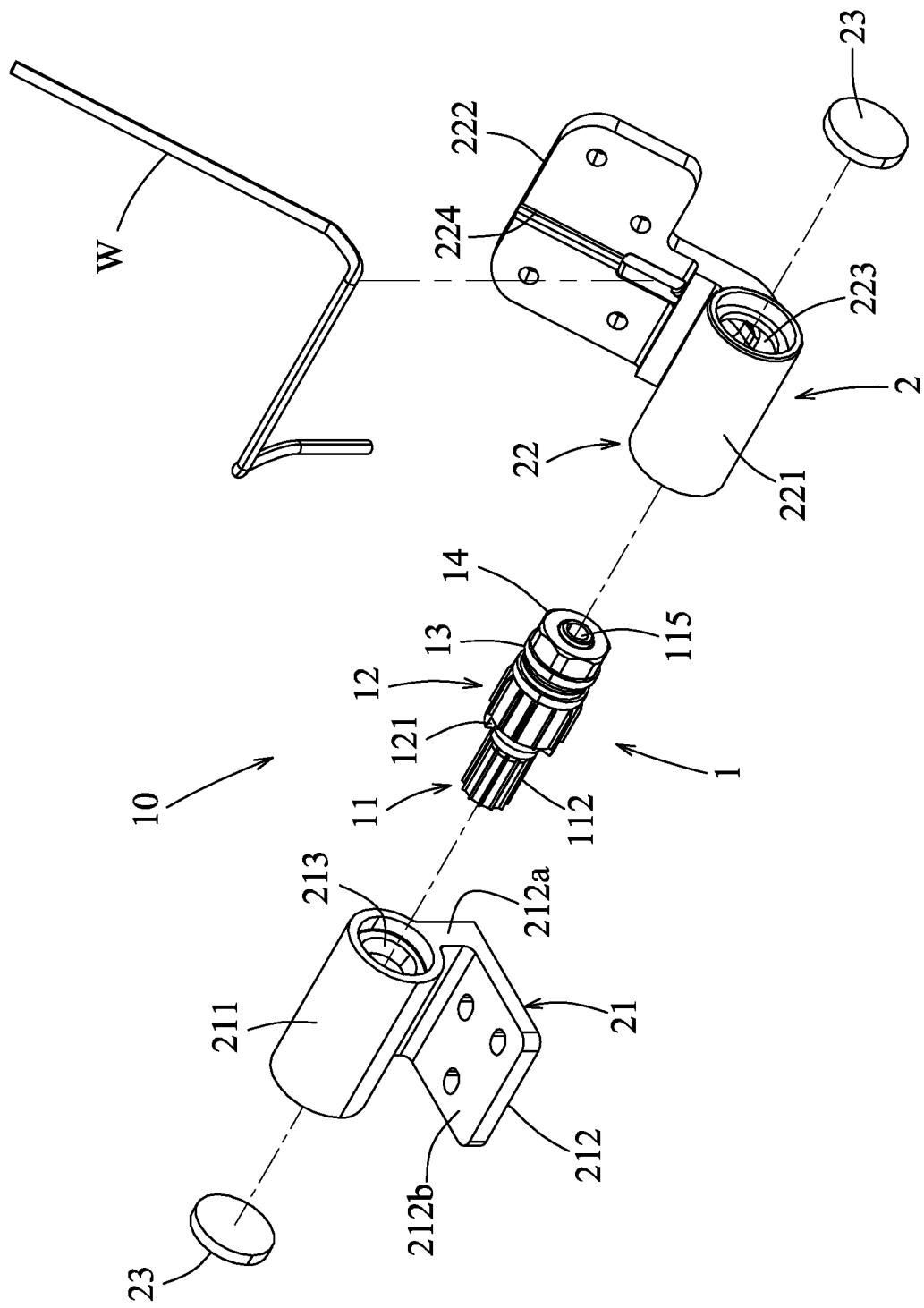
FIG. 6 is an enlarged exploded perspective view of the wire-passable hinge of the embodiment.
Figure 7:
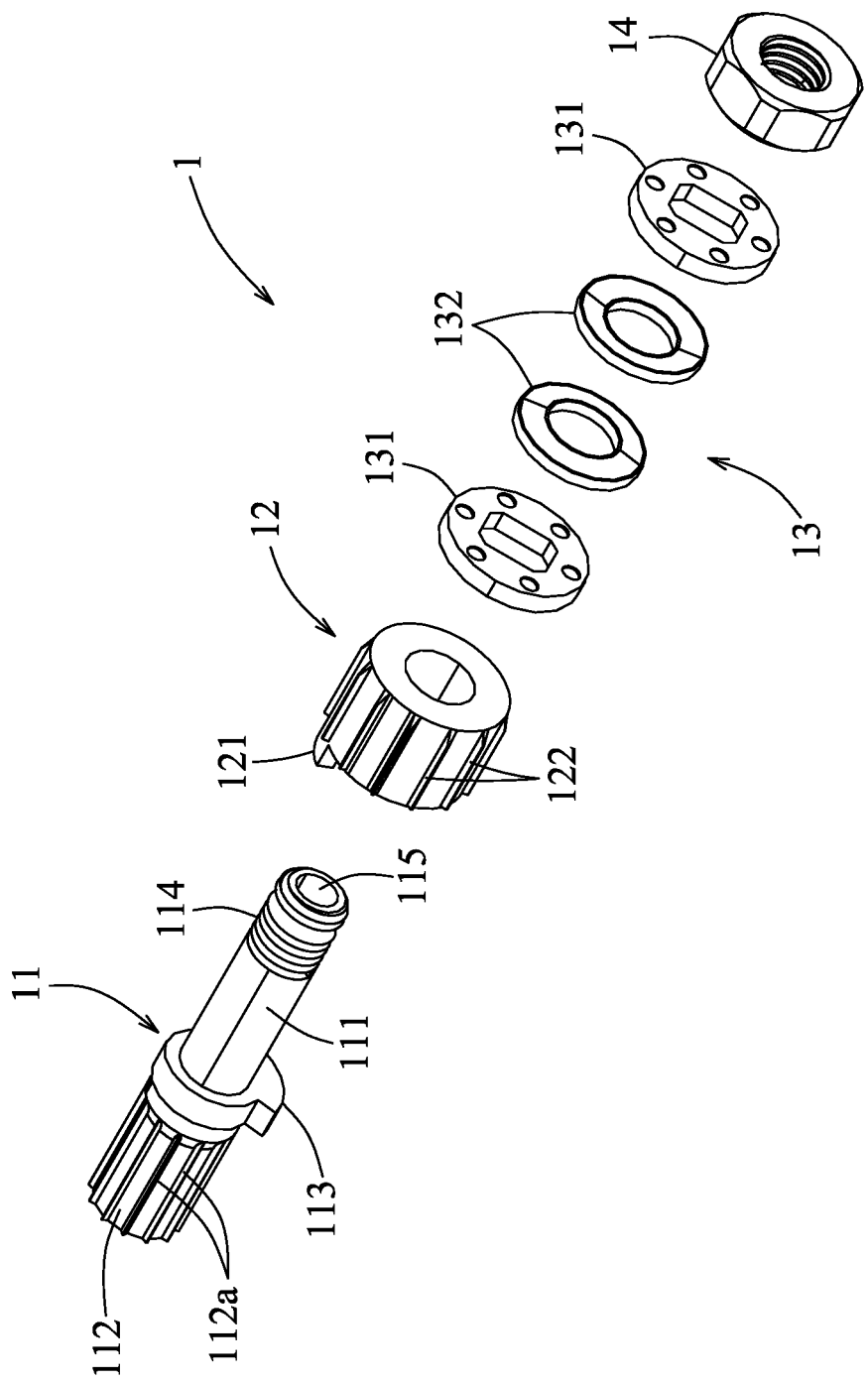
FIG. 7 is an enlarged exploded perspective view of the embodiment illustrating a rotary rod unit of the wire-passable hinge.
Figure 8:
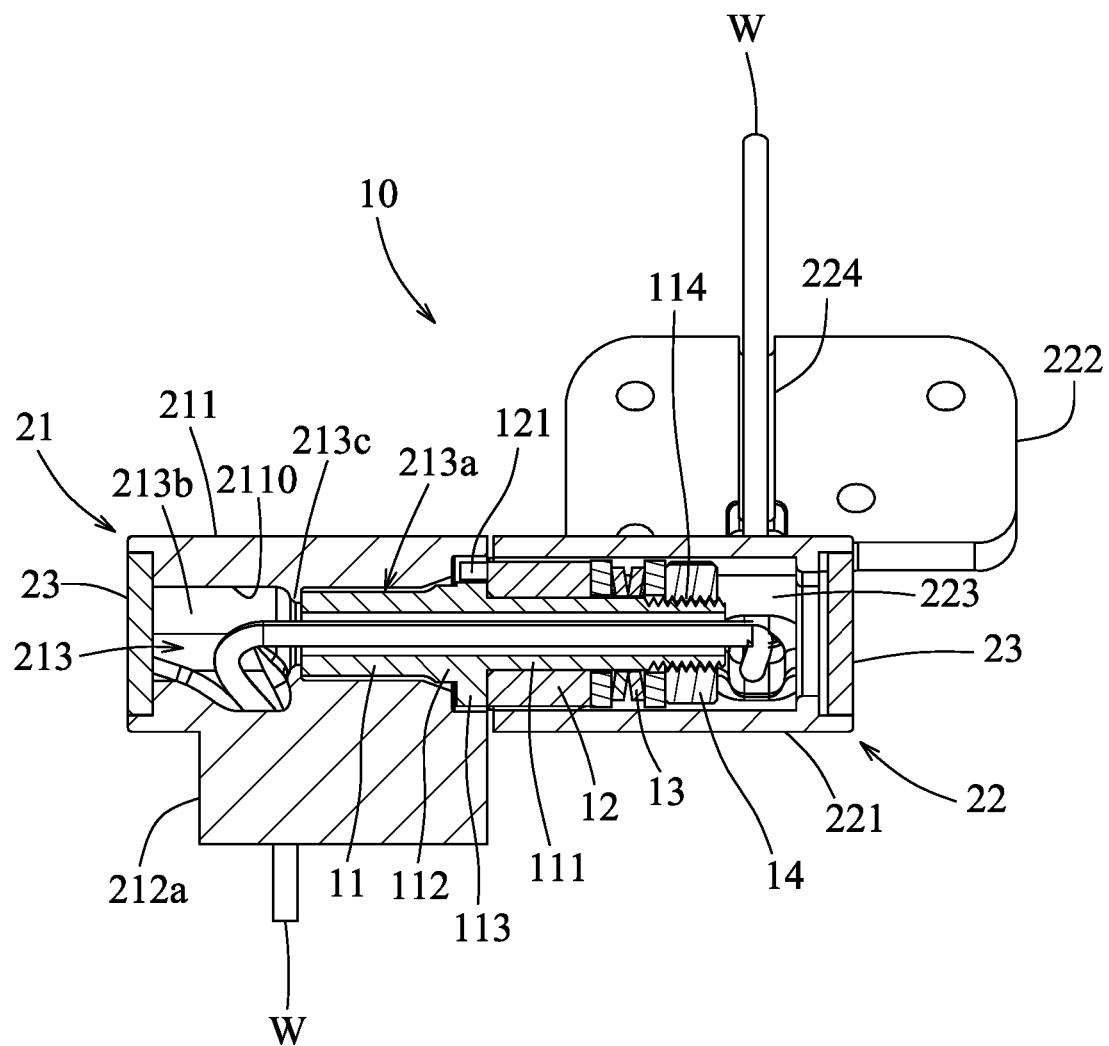
FIG. 8 is a schematic sectional view taken along line VIII-VIII from FIG. 5.

As shown in FIGS. 6 to 8, the rotary rod unit 1 includes a rotary rod 11, a bushing 12, a torsion plate subunit 13, and a nut 14. The rotary rod 11 has an insertion portion 111, a link portion 112, a fin portion 113, a threaded portion 114, and a wire passageway 115. The link portion 112 is connected to the insertion portion 111. The fin portion 113 extends outwardly from the link portion 112. The threaded portion 114 is formed at an end of the insertion portion 111 distant from the link portion 112. The wire passageway 115 extends through the insertion portion 111 and the link portion 112, and allows the conductive wire (W) to pass therethrough. The insertion portion 111 and the link portion 112 are shaped in a cylindrical form. A radius of the link portion 112 is greater than that of the insertion portion 111. A plurality of ribs 112a are formed on an outer periphery of the link portion 112 and are elongated lengthwise of the link portion 112. The bushing 12 is sleeved rotatably on the insertion portion 111 of the rotary rod 11, is in a tubular form, and has a stop block 121 that protrudes from an end of the bushing 12 adjacent to the link portion 112. A plurality of ribs 122 are formed on an outer periphery of the bushing 12. Rotation of the bushing 12 relative to the rotary rod 11 is limited upon abutment of the stop block 121 against the fin portion 113, thereby limiting a rotary angle of the busing 12 relative to the rotary rod 11. The torsion plate subunit 13 is sleeved on the insertion portion 111 of the rotary rod 11 and abuts against the bushing 12. The nut 14 is fastened to the threaded portion 114 of the insertion portion 111 opposite to the link portion 112, and abuts against the torsion plate subunit 13. In this embodiment, the torsion plate subunit 13 has two torsion plates 131 and two washers 132. The torsion plates 131 are fixedly disposed around the insertion portion 111 of the rotary rod 11, and respectively abut against the bushing 12 and the nut 14. The washers 132 are fixedly disposed around the insertion portion 111 and abut against each other between the torsion plates 131. When the bushing 12 is rotated relative to the rotary rod 11, frictional forces are generated between the bushing 12 and the rotary rod 11 and between the bushing 12 and the torsion plate subunit 13, thereby providing a torque force that is needed to actuate the wire-passable hinge 10. However, production of the torque force is not limited hereto.

As shown in FIGS. 4, 6, 8 to 10, the hinge casing unit 2 includes a first hinge casing 21 and a second hinge casing 22.

Figure 9:
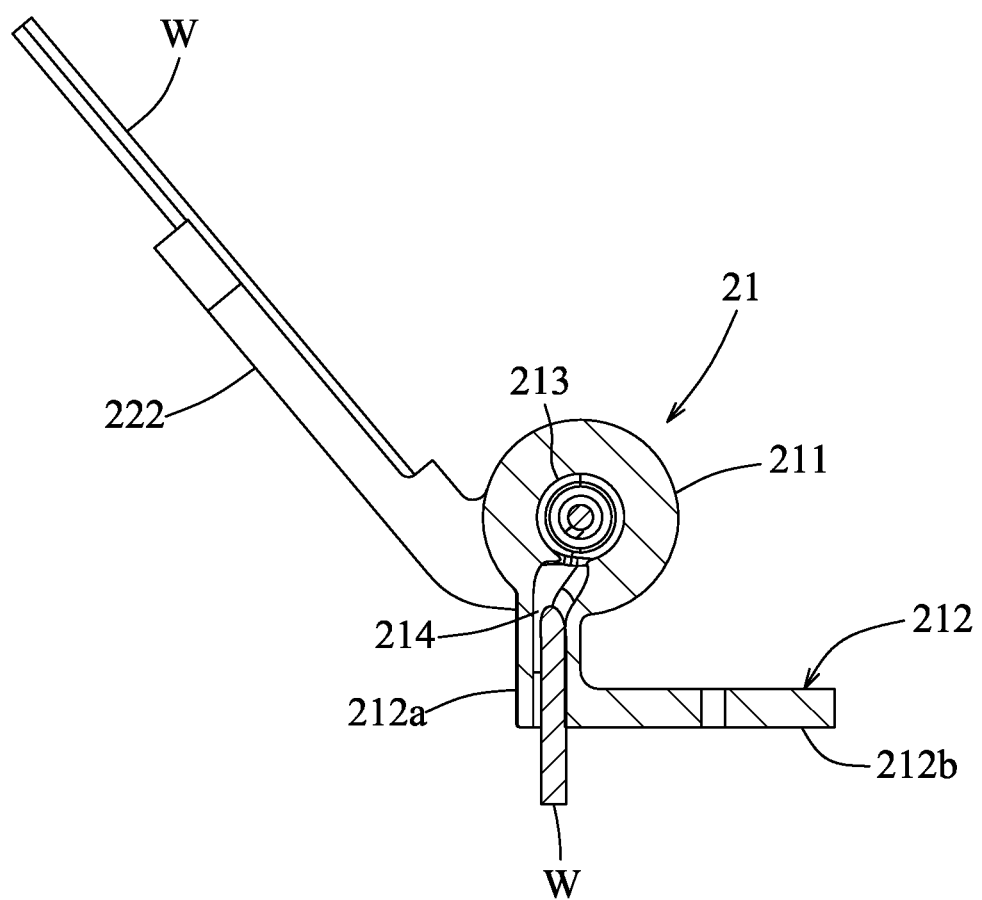
FIG. 9 is a schematic sectional view taken along line IX-IX from FIG. 5.
Figure 10:
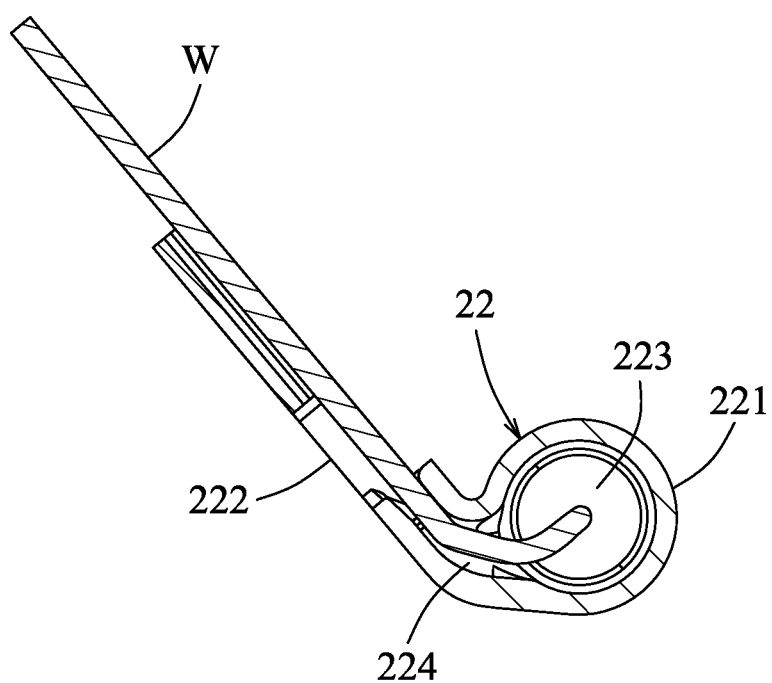
FIG. 10 is a schematic sectional view taken along line X-X from FIG. 5.

The first hinge casing 21 is adapted to be connected to the first casing body 20 and to allow the conductive wire (W) to pass therethrough. The rotary rod 11 extends immovably into the first hinge casing 21. The first hinge casing 21 has a first tube portion 211, and a first connecting plate portion 212 that is connected to the first tube portion 211 and that is adapted to be fixedly connected to the first casing body 20. The first hinge casing 21 further has a first channel 213 that is defined by the first tube portion 211. The rotary rod 11 extends immovably into the first channel 213. The first hinge casing 21 further has a first guiding hole 214 that is formed in the first connecting plate portion 212, that is in spatial communication with the first channel 213, and that is adapted to allow the conductive wire (W) to pass therethrough. In this embodiment, the first connecting plate portion 212 is L-shaped, and has an extension segment 212a and a flat plate segment 212b. The extension segment 212a extends from the first tube portion 211 and is formed with the first guiding hole 214. The flat plate segment 212b extends transversely from an end of the extension segment 212a opposite to the first tube portion 211. As shown in FIGS. 8 and 9, the first tube portion 211 has an inner surrounding surface 2110 that defines the first channel 213, and an inner protrusion 213c that protrudes inwardly from the inner surrounding surface 2110. The first channel 213 has a first receiving section 213a and a communication section 213b. The first receiving section 213a is disposed at a side of the inner protrusion 213c. The link portion 112 of the rotary rod 11 extends immovably into the first receiving section 213a. The communication section 213b is disposed at an opposite side of the inner protrusion 213c, and is in spatial communication with the first receiving section 213a and the first guiding hole 214. Referring back to FIGS. 7 and 8, by virtue of the ribs 112a on an outer periphery of the link portion 112 abutting against the inner surrounding surface 2110 of the first tube portion 211, the link portion 112 of the rotary rod 11 is nonrotatable in the first receiving section 213a of the first channel 213. The inner protrusion 213c limits and prevents the rotary rod 11 from axially moving toward the communication section 213b of the first channel 213.

The second hinge casing 22 is adapted to be connected to the second casing body 30. The bushing 12 is disposed immovably within the second hinge casing 22. The second hinge casing 22 is adapted to allow the other conductive wire (W) to pass therethrough. In this embodiment, the second hinge casing 22 has a second tube portion 221, and a second connecting plate portion 222 that is connected to the second tube portion 221 and that is adapted to be fixedly connected to the second casing body 30. The second hinge casing 22 further has a second channel 223 that is defined by the second tube portion 221. The bushing 12 is disposed immovably within the second channel 223. The second hinge casing 22 further has a second guiding hole 224 that is formed with the second connecting plate portion 222, that is in communication with the second channel 223, and that is adapted to allow the other conductive wire (W) to pass therethrough. Referring back to FIGS. 7 and 8, by virtue of the abutment of the ribs 122 on the outer periphery of the bushing 12 against an inner surface of the second tube portion 221, the bushing 12 is unrotatable in the second tube portion 221. In addition, the hinge casing unit 2 further includes two seal caps 23 that respectively close an opening of the first channel 213 opposite to the second hinge casing 22 and an opening of the second channel 223 opposite to the first hinge casing 21. By virtue of the seat caps 23, dust, debris, or water is prevented from entering the first hinge casing 21 and the second hinge casing 22, thereby avoiding damaging the conductive wire (W). The conductive wire (W) passes through the second guiding hole 224, the second channel 223, the wire passageway 115, the communication section 213b, and the first guiding hole 214 sequentially to connect the second casing body 30 to the first casing body 20. By such a wiring design, the first casing body 20 and the second casing body 30 do not need to reserve space for arrangement of the conductive wire (W). Because the conductive wire (W) may directly pass through the wire-passable hinge 10 of the present disclosure, there is no need to provide another casing for protecting the conductive wire (W), thereby improving utilization of space and facilitating a thinner design of the electronic device 100.

It should be noted that the first hinge casing 21 and the second hinge casing 22 are each formed as one piece by metal injection molding (MIM) in cooperation with a POM or PMMA lost foam casting process, thereby producing a tunnel structure that general molds are incapable of making. The tunnel structure has the first channel 213, the first guiding hole 214, the second channel 223, and the second guiding hole 224.

Figure 11:
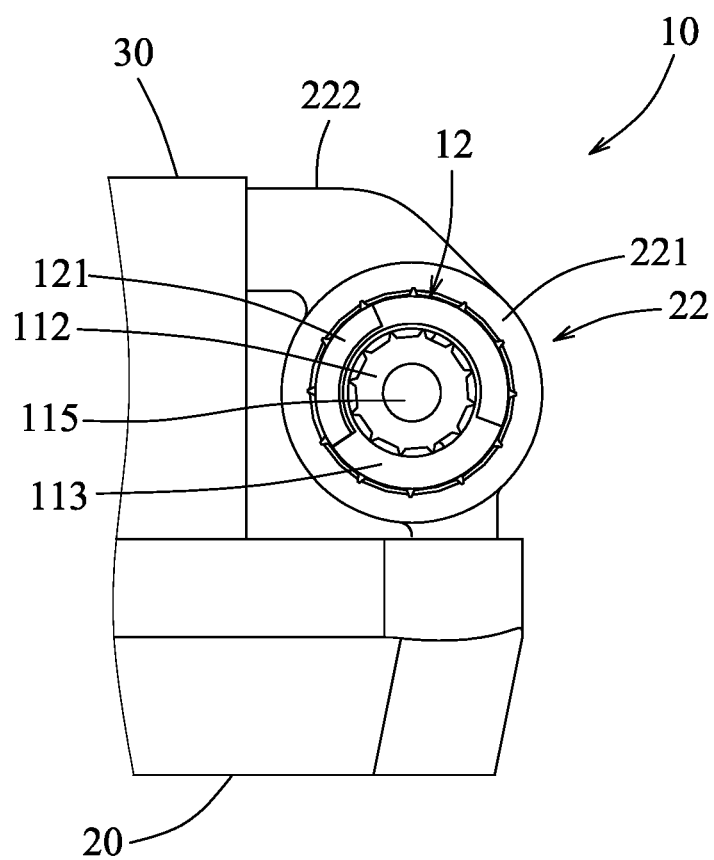
FIG. 11 is an enlarged fragmentary side view of the embodiment illustrating a bushing of the rotary rod unit of the wire-passable hinge in a first position.
Figure 12:
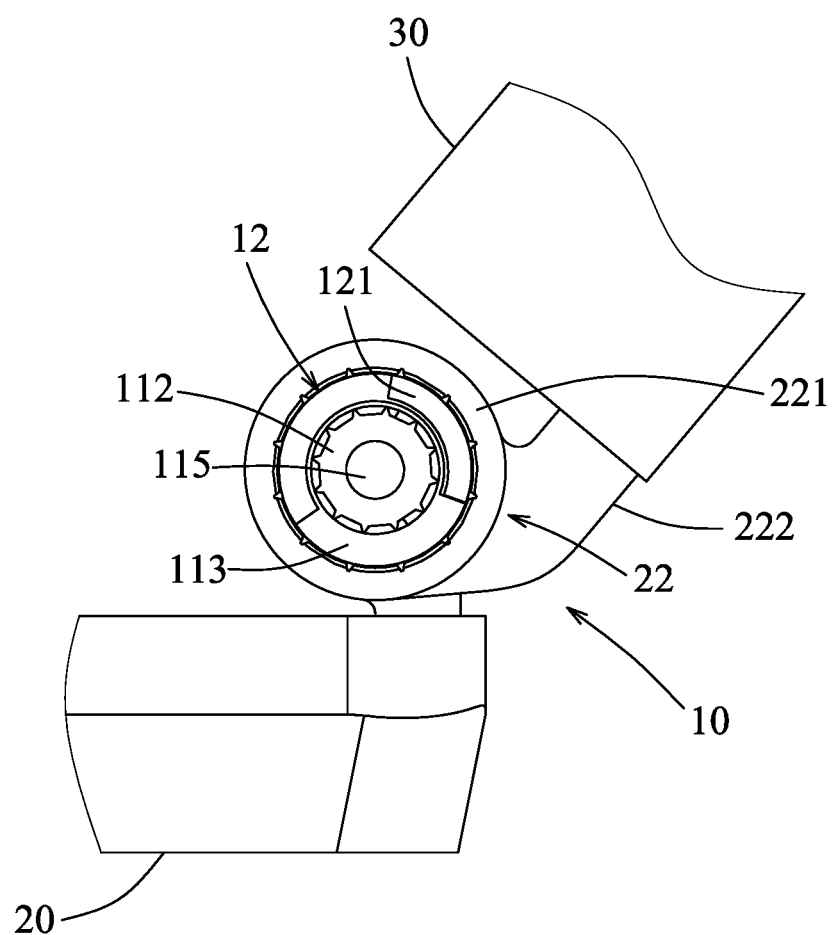
FIG. 12 is an enlarged fragmentary side view of the embodiment illustrating the bushing of the rotary rod unit of the wire-passable hinge in a second position.

Referring to FIGS. 11 and 12 in combination with FIGS. 3 and 4, when the first casing body 20 and the second casing body 30 are moved from a folded state (see FIG. 3) to an unfolded state (see FIG. 4), the second casing body 30 together with the second hinge casing 22 of each of the wire-passable hinges 10 drives the bushing 12 to rotate relative to the rotary rod 11 from a first position (see FIG. 11) to a second position (see FIG. 12). As shown in FIG. 11, in the first position, the stop block 121 of the bushing 12 abuts against a left end of the fin portion 113 of the rotary rod 11 in the figure, and meanwhile the first casing body 20 and the second casing body 30 lean on each other in the folded state. As shown in FIG. 12, during rotation of the bushing 12 from the first position to the second position, the stop block 121 of the bushing 12 rotates clockwise in the figure and abuts against a right end of the fin portion 113 of the rotary rod 11. Meanwhile, the first casing body 20 and the second casing body 30 are moved to the unfolded state so as to form an included angle therebetween.

In summary, by virtue of the wire passageway 115 of the rotary rod unit 1 in cooperation with the first hinge casing 21 and the second hinge casing 22 allowing the conductive wire (W) to pass therethrough, the first casing body 20 and the second casing body 30 do not need to reserve space for the arrangement of the conductive wire (W), and there is no need to provide another casing for protecting the conductive wire (W), thereby improving the utilization of space and facilitating the thinner design of the electronic device 100.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without the another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A wire-passable hinge adapted to be mounted between a first casing body and a second casing body of an electronic device, the first casing body and the second casing body being electrically connected to each other by a conductive wire, said wire-passable hinge comprising:
   a rotary rod unit including
      a rotary rod that has a wire passageway adapted to allow the conductive wire to pass therethrough, and
      a bushing that is sleeved rotatably on said rotary rod; and
   a hinge casing unit including
      a first hinge casing that is adapted to be connected to the first casing body, said rotary rod extending immovably into said first hinge casing, said first hinge casing being further adapted to allow the conductive wire to pass therethrough, and
      a second hinge casing that is adapted to be connected to the second casing body, said bushing being disposed immovably within said second hinge casing, said second hinge casing being further adapted to allow the conductive wire to pass therethrough;
   wherein said first hinge casing has a first tube portion and a first connecting plate portion that is connected to said first tube portion and that is adapted to be fixedly connected to the first casing body;
   wherein said first hinge casing further has a first channel that is defined by said first tube portion, said rotary rod extending immovably into said first channel; and
   wherein said first hinge casing further has a first guiding hole that is formed in said first connecting plate portion, that is in spatial communication with said first channel, and that is adapted to allow the conductive wire to pass therethrough.

2. The wire-passable hinge as claimed in claim 1, wherein said first connecting plate portion has:
   an extension segment that extends from said first tube portion and that is formed with said first guiding hole; and
   a flat plate segment that extends transversely from an end of said extension segment opposite to said first tube portion.

3. The wire-passable hinge as claimed in claim 2, wherein:
   said first tube portion has an inner surrounding surface that defines said first channel, and an inner protrusion that protrudes inwardly from said inner surrounding surface; and
   said first channel has
      a first receiving section that is disposed at a side of said inner protrusion, said rotary rod extending immovably into said first receiving section, and
      a communication section that is disposed at an opposite side of said inner protrusion, and that is in spatial communication with said first receiving section and said first guiding hole.

4. The wire-passable hinge as claimed in claim 3, wherein:
   said second hinge casing has a second tube portion and a second connecting plate portion that is connected to said second tube portion and that is adapted to be fixedly connected to the second casing body;
   said second hinge casing further has a second channel that is defined by said second tube portion, said bushing being disposed immovably within said second channel; and
   said second hinge casing further has a second guiding hole that is formed with said second connecting plate portion, that is in communication with said second channel, and that is adapted to allow the conductive wire to pass therethrough.

5. The wire-passable hinge as claimed in claim 4, wherein said hinge casing unit further includes two seal caps that respectively close an opening of said first channel opposite to said second hinge casing and an opening of said second channel opposite to said first hinge casing.

6. The wire-passable hinge as claimed in claim 1, wherein:
   said rotary rod further has
      an insertion portion, said bushing being sleeved rotatably on said insertion portion, and a link portion that is connected to said insertion portion and that extends immovably into said first hinge casing; and said wire passageway extends through said insertion portion and said link portion.

7. The wire-passable hinge as claimed in claim 6, wherein said bushing has a stop block that protrudes from an end of said bushing adjacent to said link portion; and said rotary rod further has a fin portion that extends outwardly from said link portion, such that rotation of said bushing relative to said rotary rod is limited upon abutment of said stop block against said fin portion.

8. The wire-passable hinge as claimed in claim 6, wherein said rotary rod unit further includes:

a torsion plate subunit that is sleeved on said insertion portion of said rotary rod and that abuts against said bushing; and a nut that is fastened to an end of said insertion portion opposite to said link portion and that abuts against said torsion plate subunit.

9. A wire-passable hinge adapted to be mounted between a first casing body and a second casing body of an electronic device, the first casing body and the second casing body being electrically connected to each other by a conductive wire, said wire-passable hinge comprising:

a rotary rod unit including a rotary rod that has a wire passageway adapted to allow the conductive wire to pass therethrough, and a bushing that is sleeved rotatably on said rotary rod; and a hinge casing unit including a first hinge casing that is adapted to be connected to the first casing body, said rotary rod extending immovably into said first hinge casing, said first hinge casing being further adapted to allow the conductive wire to pass therethrough, and a second hinge casing that is adapted to be connected to the second casing body, said bushing being disposed immovably within said second hinge casing, said second hinge casing being further adapted to allow the conductive wire to pass therethrough;

wherein said rotary rod further includes an insertion portion, said bushing being sleeved rotatably on said insertion portion;

a link portion that is connected to said insertion portion and that extends immovably into said first hinge casing, wherein said wire passageway extends through said insertion portion and said link portion;

a torsion plate subunit that is sleeved on said insertion portion of said rotary rod and that abuts against said bushing; and a nut that is fastened to an end of said insertion portion opposite to said link portion and that abuts against said torsion plate subunit.

* * * * *